United States Patent [19]

Mentler

[11] 4,302,807

[45] Nov. 24, 1981

[54] CONTROLLED CURRENT BASE DRIVE CIRCUIT

[75] Inventor: Sandor Mentler, Downingtown, Pa.

[73] Assignee: Burroughs Corporation, Detroit, Mich.

[21] Appl. No.: 174,753

[22] Filed: Aug. 4, 1980

[51] Int. Cl.³ .................................... H02M 7/537
[52] U.S. Cl. .......................... 363/134; 307/280; 323/289
[58] Field of Search ............. 307/254, 280, 300; 323/289; 363/22-26, 50, 55, 56, 133, 134

[56] References Cited

U.S. PATENT DOCUMENTS 3,663,941  5/1972  Pasciutti .......................... 363/23
3,909,695  9/1975  Peck ................................ 363/25
4,254,459  3/1981  Belson ............................. 363/24

Primary Examiner—A. D. Pellinen
Attorney, Agent, or Firm—Mark T. Starr

[57] ABSTRACT

A base drive circuit particularly well adapted for use with bipolar transistors in high frequency power conversion schemes. The base drive circuit allows achieving desired values for both forward and reverse base drive currents simultaneously regardless of the characteristics of the bipolar transistor driven. When utilized in a transformer isolated inverter system, the base drive circuit additionally presents a polarity insensitive input impedance which eliminates the effects of cross-conduction between base drive circuits connected to the secondary side of the isolation transformer.

14 Claims, 6 Drawing Figures

CONTROLLED CURRENT BASE DRIVE CIRCUIT

CROSS-REFERENCE TO RELATED APPLICATION

Reference is hereby made to a pending U.S. patent application, entitled BASE DRIVE CIRCUIT, Ser. No. 146,648, by the same inventor as the instant application and assigned to the same assignee as the instant application, filed May 5, 1980.

BACKGROUND OF THE INVENTION

The present invention relates in general to the field of high frequency power conversion. More particularly, the present invention relates to a high frequency switch mode type power supply which generates an ac-type waveform by rapidly switching on and off one or more dc voltage sources. Still more particularly, the present invention relates to a base drive circuit which is used to couple turn-on and turn-off signals to a power amplifying device such as a bipolar transistor utilized in the inverter section of a power supply.

Referring now to FIG. 1, those skilled in the prior art will realize that a bipolar transistor 10 may be used as an ON-OFF switch to energize the load 12 with a voltage source, VL. Thus, transistor 10 will be turned on and the load 12 energized whenever base current IB1 is forced to flow. In order to quickly de-energize the load 12, it is generally insufficient to set IB1 to zero since minority carriers stored in the base region of transistor 10 must recombine before collector current will cease to flow following the interruption of IB1. The resulting delay, referred to as storage time, is in general unacceptably long unless the charge stored in the base region of transistor 10 is removed by external means such as a reverse base drive current IB2. Current reversal can be accomplished by reversing the polarity of the bias voltage VBE. The use of reverse base-emitter voltage has the further advantages of decreasing the collector current fall time during turn off and allowing the transistor 10 to withstand higher collector-emitter voltages once it is in the OFF state.

In the design of switch mode power supplies, the object is to produce an ac-type waveform which will then be transformed down, rectified and filtered to produce a dc voltage which is typically used to power some logic circuitry. To generate the ac-type waveform, switch mode power supplies often utilize two power switches such that when one switch is turned on the other switch is turned off. One of the switches controls the application of a positive dc voltage to the load while the other switch controls the application of a negative dc voltage, with the result that by operating the switches in a push-pull manner an ac-type voltage is applied to the load.

Bipolar transistors are frequently used as the power switches because of their fast switching speed and ability to handle high voltages and currents. In order to rapidly turn on and off the bases of the bipolar transistors and thus be able to generate a high frequency ac-type voltage, a base drive circuit for coupling control signals into the base of the power switch (i.e., bipolar transistor) while at the same time achieving fast turn off of that power switch is required.

The design of base drive circuits for power inverters is well known in the prior art. Thus, for example, in "Base Drive Considerations in High Power Switching Transistors" by Dennis Roark, TRW Power Semiconductors Application Note No. 120, January, 1975, a circuit to provide transformer isolated base drive which is readily employable in a power inverter is described. When such a base drive circuit is used in an inverter, two of the base drive circuits are connected to the secondary of an isolation transformer, each to couple one of two switching signals from the primary side of the isolation transformer to one of two power switches respectively, the two power switches energizing one side of the load with either the common or V+ output of a high voltage dc power supply, respectively, the other side of the load being connected to a dc voltage of +V/2, thus applying an ac-type voltage to the load.

A first problem with the latter discussed prior art circuit occurs due to the less than perfect characteristics of practical coupling transformers, which can result in both power switching transistors conducting simultaneously under certain operating conditions. This simultaneous conduction, called cross conduction, is equivalent to a short circuit being placed across the high voltage supply and leads to degradation and eventual destruction of the power switching transistors. The operating conditions referred to are those where the power switching transistors are turned on for time durations which are short relative to the overall period of operation; viz, low duty cycle operation. The problem experienced with low duty cycle operation may in some cases be ovecome by utilizing an optimized coupling transformer. But even with an optimized coupling transformer, there would be a limit on how far the pulse width could be reduced before cross conduction problems would be experienced.

A second problem with the latter discussed prior art circuit occurs due to the inability to control both IB1 and IB2; viz, the user can pick either IB1 or IB2, but is normally stuck with the resulting value of IB2 or IB1, respectively. Although somewhat dependent on the transistor's characteristics, in general the greater the value of IB2, the faster the transistor will turn off; viz, the transistor's turn-off time is inversely proportional to IB2. The inability to control both IB1 and IB2 oftentimes presents a problem since the value of IB1 is often dictated by the application, thus giving the designer no choice as to the value of IB2. Thus, for example, in a typical switching power supply, the value of IB1 is fixed by the gain of the transistor which when multiplied by IB1 must be equal to or greater than the load current.

The cross-conduction problem of the prior art has been overcome by the invention described in pending U.S. patent application, Ser. No. 146,648, which is incorporated and made part of the present disclosure. It is a general object of the present invention to overcome both of the identified prior art problems by providing an improved circuit for coupling control signals into the base of a power switch.

It is a further object of the present invention to provide an improved base drive circuit which allows the user to select the values of both the forward base drive current IB1 and the reverse base drive current IB2.

It is another object of the present invention to provide an improved base drive circuit which allows the user to meet load current requirements while simultaneously allowing the desired storage time to be obtained.

It is a further object of the present invention to provide a circuit for coupling control signals into the base of a power switch and at the same time achieving fast turn off of the power switch.

It is another object of the present invention to provide an improved high frequency switch mode type power supply.

It is still another object of the present invention to provide an improved inverter circuit capable of operating with a very short duty cycle.

It is still a further object of the present invention to provide an improved transformer isolated base drive circuit which provides a polarity insensitive input impedance.

These and other objects, features and advantages of the present invention will become more apparent from the detailed description of the preferred embodiment when read in conjunction with the drawings.

SUMMARY OF THE INVENTION

The above and other objects of the present invention are realized through a base drive circuit which allows achieving desired values of both forward and reverse base drive currents regardless of the characteristics of the switching transistors utilized in the base drive circuit. Due to the ability to control both forward and reverse base drive currents, the circuit can minimize saturation losses, storage time, and switching losses, while achieving fast transition between the forward and reverse base drive currents. Two embodiments of the base drive circuit, corresponding to worst case extremes in the characteristics of the switching transistors utilized, are disclosed. A first embodiment disclosed considers the use of a high gain transistor (such as a Darlington) as the power switch, while in the second embodiment the power switch is a relatively low gain type. Both embodiments disclosed provide an equivalent input impedance regardless of the voltage polarity applied at their input.

Also disclosed is a high frequency switch mode type power inverter which utilizes the disclosed base drive circuit. In the power inverter disclosed, first and second switches on the primary side of a base drive transformer are coupled to corresponding first and second base drive circuits on the secondry side of the transformer, the first and second base drive circuits driving the bases of corresponding first and second bipolar power switching transistors, the first and second bipolar power switching transistors switching a high voltage source applied to a load between a positive and negative value respectively. A third switch, connected to an additional transformer primary winding, is simultaneously closed whenever either the first or second switch is opened, the third switch's associated circuitry effectively placing a short circuit across the transformer primary so as to minimize the magnetizing current released by the transformer from being coupled to the transformer's secondary windings.

With either of the two transformer secondary windings biased in the forward direction so as to turn on its associated base drive circuit and power switching transistor, or reversed biased so as to turn off the power switching transistor, each of the two base drive circuits presents the same impedance to the transformer, thus minimizing the possibility of cross conduction between the two base drive circuits.

DETAILED DESCRIPTION OF THE PREFERRED EMBODIMENT

Figure 1:
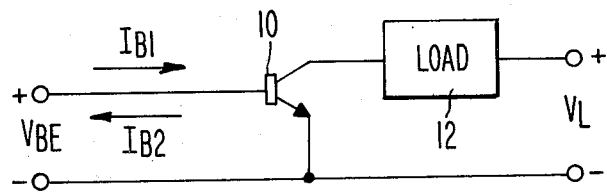
FIG. 1 is a schematic drawing of a bipolar transistor used in a prior art on-off switch.
Figure 2:
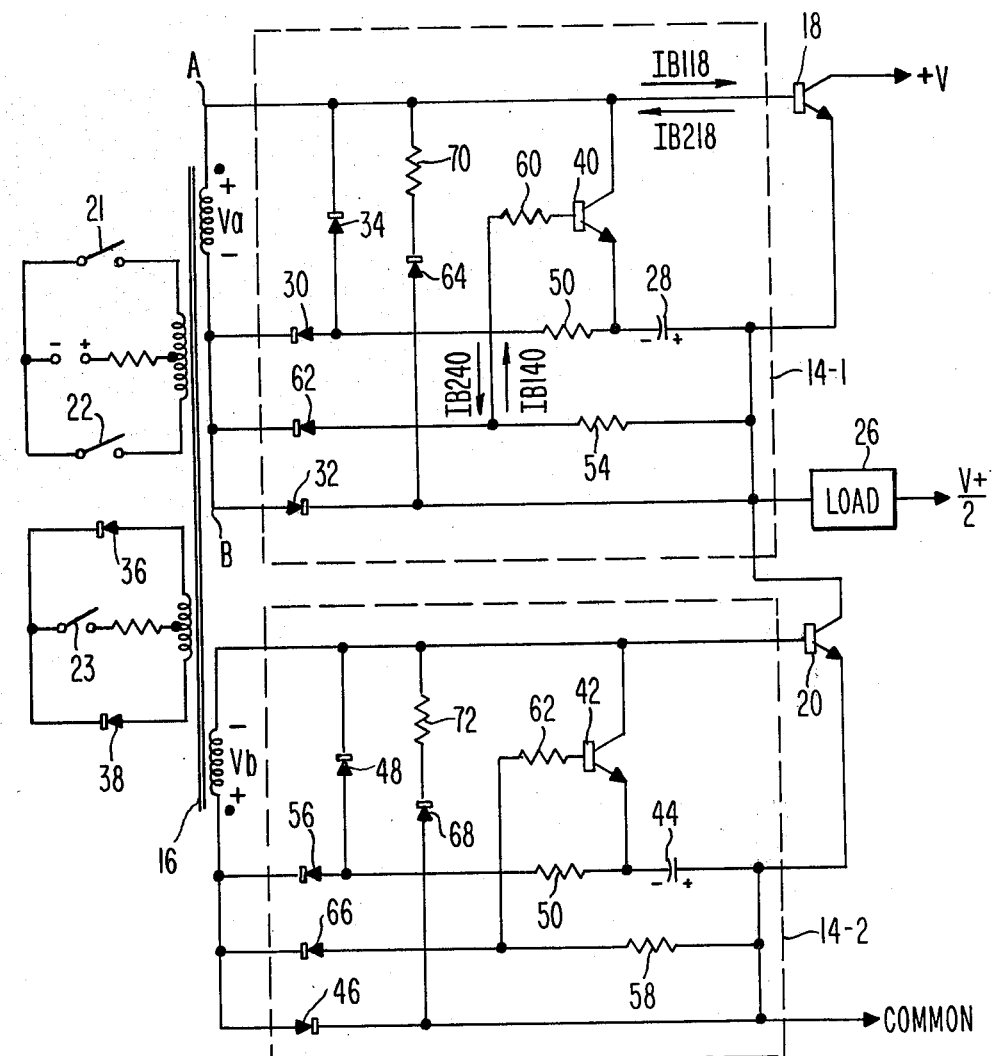
FIG. 2 is a schematic drawing of the base drive circuit of the present invention used in a transformer coupled high frequency power inverter.

As shown in FIG. 2, the base drive (or turn-off) circuits 14-1, 2 of the present invention may be used to couple control signals from the primary side of coupling transformer 16 to power switches 18 and 20, respectively, such that the apparatus of FIG. 2 may be utilized as a high frequency power inverter.

As will be obvious to those skilled in the art, transformer 16 is used to couple a low voltage circuit composed of switches 21, 22 and 23 on the primary side of transformer 16 to the circuitry on the secondary side of transformer 16, which in general operates at high voltages. Thus, transformer 16 serves to electrically isolate switches 21, 22 and 23, which typically operate at a dc common voltage level in the area of 20–25 vdc, from the bases of transistors 18 and 20, which are indirectly connected to the high voltage dc power line.

Although shown in FIG. 2 as mechanical switches, those skilled in the art will readily appreciate that transistorized circuitry may be substituted for and to control the switching of switches 21, 22, and 23. In addition, it will be noted that transistors 18 and 20 may be alternately turned on by the action of switches 21 and 22. Further, as transistors 18 and 20 act as switches, the voltage across the load 26 consists of a series of alternating retangular pulses having peaks of $\frac{1}{2}V+$ and $-\frac{1}{2}V+$ volts.

The preferred embodiment of the present invention generally operates at some fixed frequency. For example, a typical frequency of operation could be 20 KHz. For a 20 KHz frequency of operation, each half cycle of the ac-type waveform to be generated is 25 $\mu$sec in duration. Basically then, switch 21 would be closed for at most 25 $\mu$sec to generate the positive half cycle across the load 26. Switch 21 would then be opened and switch 22 would be closed to generate the other half cycle for another 25 $\mu$sec.

A more typical mode of operation would be one where each of the switches 21, 22 is not closed for the full 25 $\mu$sec half cycle and thus the circuit output has a dead (or dwell) time. For example, assuming a 25 $\mu$sec half cycle, the application might call for a positive voltage pulse of 15 $\mu$sec duration to be supplied to the load 26. In such case, switch 21 would be closed for 15 $\mu$sec, then switch 21 would be opened, and switch 23 would be closed for the 10 $\mu$sec dead time.

Switch 23 and its associated circuitry (consisting of the extra primary winding and diodes 36 and 38) is present to partially compensate for the fact that transformer 16 is a non-ideal magnetic device. Thus, when switch 21 is closed there is a magnetizing current in the transformer 16 (since transformer 16 is effectively an inductor and it is being charged up with energy). If switch 23 was not in the inverter circuit and all that was done was to open switch 21, there would be an inductive kick (due to the magnetic field stored in transformer 16) when switch 21 opened that would tend to go to the wrong place; viz, it would tend to turn transistor 20 on or keep transistor 18 on for a longer time than needed. In order to partially prevent the energy stored in transformer 16 from being coupled into the secondary of transformer 16, switch 23 is closed so that the inductive current flowing through transformer 16 will flow through switch 23 and through one of the diodes 36, 38. Although switch 23 and its associated circuitry partially compensates for the inherent limitations of transformer 16, problems due to the leakage inductance of transformer 16 are still present when the circuit is operated at short pulse widths; i.e., switches 21 and 22 closed for very short periods of time relative to the total time available for them to be closed. The present invention is effective to greatly limit the effects of the latter mentioned problem.

Again referring to FIG. 2, when prior art base drive circuits were utilized instead of the base drive circuits 14-1, 2 of the present invention or those disclosed in pending application Ser. No. 146,648, due to the less than perfect characteristics of practical coupling transformers, under certain operating conditions both power switching transistors 18 and 20 would conduct simultaneously. This simultaneous conduction causes the equivalent of a short circuit across the high voltage dc supply and leads to the degradation and eventual destruction of transistors 18 and 20. The conditions under which the simultaneous conduction occurs with prior art base drive circuits are those where transistors 18 and 20 are turned on for time durations which are short relative to the overall period of operation; viz, for low duty cycle operation.

Still referring to FIG. 2, with switch 21 closed and switches 22 and 23 both open, Va has the polarity shown and transistor 18 is turned on by base drive current IB118. Since Va and Vb are of opposite polarity, transistor 20 is off. When switch 21 opens, switch 23 is simultaneously closed and effectively places a short circuit across the primary of transformer 16. Va and Vb do not immediately collapse to zero due to the primary winding being shorted, but instead exhibit over and undershoots because the coupling between the various windings of transformer 16 is imperfect; viz, leakage inductances exist.

The problem that occurs with some prior art base drive (or turn-off) circuits utilized in an inverter operated at short duty cycles is due to the impedance of some prior art turn-off networks being polarity dependent. Thus, when utilizing some turn-off networks of the prior art and operating with switches 21 and 22 closed for very short periods of time relative to the total time available for them to be closed, the currents through the leakage inductance of transformer 16 decays to zero eventually, but their flow causes voltage drops to be developed across the secondary windings of transformer 16. Due to the inequality of the leakage inductance currents flowing into the two secondary circuits at the moment switch 21 (or 22) opens, the currents into the two secondary circuits are not equal, this being due to the impendance of the turn-off networks being polarity dependent. Thus, as Va and Vb have equal magnitude but opposite polarity during each conduction period (i.e., when either switch 21 or switch 22 is closed), the magnitudes of the two secondary currents are unequal. This results in the polarity reversal and cross conduction which has the effect of Vb momentarily reversing polarity and transistor 20 being turned on while transistor 18 has not yet fully turned off.

The turn-off network of the present invention prevents short-duty cycle cross-conduction problems by providing a turn-off network 14-1,2 with polarity insensitive input impendance, while at the same time allowing the user to achieve desired values for base drive quantities IB118 and IB218 simultaneously regardless of the characteristics of transistors 18 and 40.

In order to understand the operation and use of the present invention, two worst case possibilities will be considered. Although all references will be to turn-off network 14-1, the discussion is identically applicable to turn-off network 14-2. In the first case, it will be assumed that transistor 18 is a high gain type such as a Darlington, while transistor 40 has a relatively low gain. In such case, resistor 60 will be shorted out, the network consisting of resistor 70 and diode 64 will be replaced by an open circuit, and resistor 54 will be selected first as being equal to $(VC28-VBE40)/IB140$, where VC28 is the voltage across capacitor 28, VBE40 is the base-to-emitter voltage drop across transistor 40 and IB140 is the forward base drive current through transistor 40. Next, the appropriate number of diodes 62 are series connected so as to limit IB118 to the desired value. That is, as the number of diodes 62 is increased, the voltage available across resistor 54 decreases, which in turn reduces the current through resistor 54 (which is IB118) without affecting the base drive of transistor 40.

In the second extreme case, transistor 18 is a low gain transistor while transistor 40 has relatively high gain. In this case, diode 62 is a single diode and resistor 54 is selected as being equal to $VC28/IB118$, where IB118 is the forward base drive current through transistor 18. Resistor 60 is used to limit the base current through transistor 40 to the desired value. That is, you choose resistor 54 to get the desired IB118 and then, since the current through the base-emitter junction of transistor 40 is too high, you limit it via resistor 60. As will be explained in further detail, infra, in the second case the network consisting of resistor 70 and diode 64 is present in order to assure that the base drive circuit provides an equivalent input impedance regardless of the voltage polarity applied at its input.

In both cases, the purposes of diodes 32 and 34 and resistor 50 is the same as the functions for the equivalent elements in the base drive circuit described in pending U.S. patent application Ser. No. 146,648. Diode 32 is doubled when transistor 18 is a Darlington transistor. Diode 62 serves to block the current which would otherwise flow from the base to collector of transistor 40 whenever Va is of polarity opposite to that shown in FIG. 2.

Figure 3A:
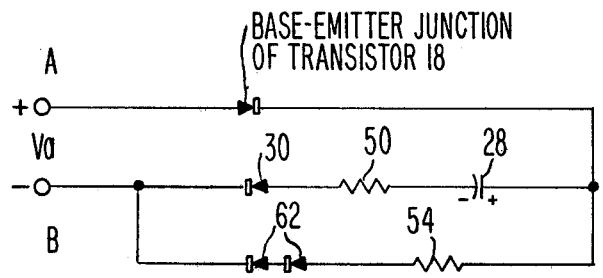
FIGS. 3A–3D schematically shows the equivalent base drive circuit presented to the transformer secondary under different conditions and with alternate transistor types utilized.
Figure 3B:
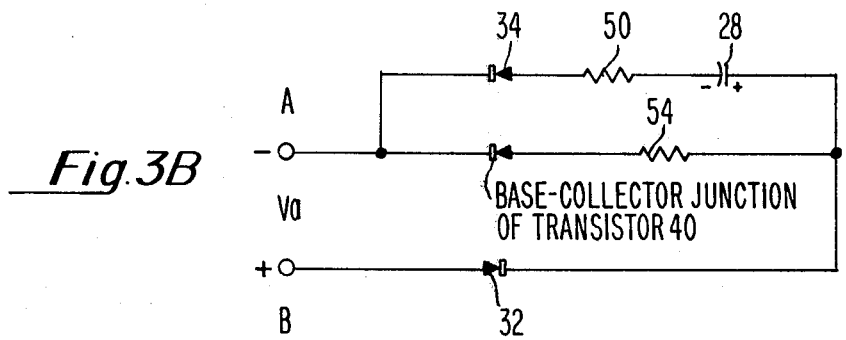

As stated previously, the turn-off network 14-1,2 presents a polarity insensitive input impedance to the secondary of transformer 16. Thus, in the first case defined above and with Va having the polarity shown in FIG. 2, transistor 18 is turned on and the equivalent network presented to the secondary of transformer 16 is as shown in FIG. 3A. When this network is operated under low duty cycle conditions, the component values are such that the impedance of the branch consisting of diode(s) 62 and resistor 54 is very high compared to the impedance of the branch consisting of diode 30, resistor 50 and capacitor 28. Therefore, the equivalent network is in effect the series connection of diode 30, resistor 50, capacitor 28 and the base-emitter junction of transistor 18. In the first case, but with Va having polarity opposite to that shown in FIG. 2, transistor 18 is turned off and the equivalent network presented to the secondary of transformer 16 is as shown in FIG. 3B. In this latter network, the component values are such that the impedance of the branch consisting of resistor 54 and the base-collector junction of transistor 40 will have a relatively high impedance and can be neglected, thus leaving the branch consisting of diode 34, resistor 50 and capacitor 28 as the limiting impedance. Comparing the effective equivalent networks of FIGS. 3A and 3B, it will be seen that they are equivalent, each consisting of two diodes in series with a resistor 50 and a capacitor 28. Diode 32 of FIG. 3B tries to imitate the base-emitter junction of transistor 18 in the network of FIG. 3A. Therefore, if the base emitter junction of transistor 18 consists of two diode drops, such as in a Darlington transistor, then to obtain equality of networks diode 32 would have to be changed to two series diodes instead of the presently shown single diode.

Figure 3C:
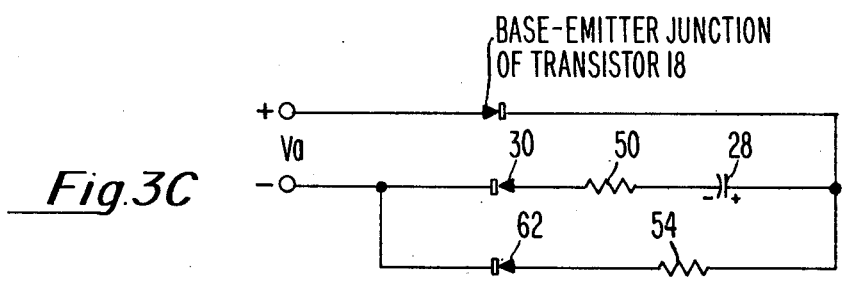
Figure 3D:
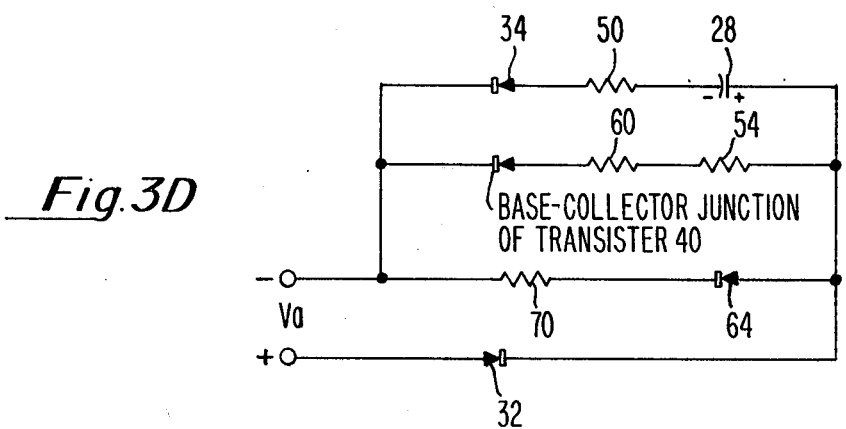

In the second case defined previously and with Va having the polarity shown in FIG. 2, transistor 18 is turned on and the equivalent network presented to the secondary of transformer 16 is as shown in FIG. 3C. Note that the network of FIG. 3C is equivalent to that for the first case except that diode 62 will never be more than one diode. In the second case, but with Va having polarity opposite to that shown in FIG. 2, transistor 18 is turned off and the equivalent network is as shown in FIG. 3D. Normally, diode 32 in FIG. 3D is set to be equal to the base-emitter junction of transistor 18 in FIG. 3C. However, if transistor 18 had a large base-emitter junction drop, say 1.5 volts or more, then diode 32 could consist of multiple diodes in series. Diode 34 in FIG. 3D is equivalent to diode 30 in FIG. 3C. The branch consisting of diode 62 and resistor 54 in FIG. 3C is replaced in the network of FIG. 3D by the parallel combination of the branch consisting of resistor 70 and diode 64 and the branch consisting of resistors 54 and 60 and the base-collector junction of transistor 40. The branch consisting of resistor 70 and diode 64 are added because the branch of resistors 54 and 60 and the base-collector junction of transistor 40 could never imitate the branch consisting of resistor 54 and diode 62 in FIG. 3C, since the resistance of the former branch is too high with respect to the latter. By adding the branch consisting of resistor 70 and diode 64 in FIG. 3D, the resistance of the former branch is lowered so that the network is equivalent to that when Va has polarity as shown in FIG. 2.

Thus, it has been demonstrated that the impedance presented to the transformer 16 secondary is electrically equivalent regardless of the polarity of Va.

As stated previously, the circuit 14-1 of FIG. 2 allows the user to achieve desired values for both IB118 and IB218 simultaneously regardless of the characteristics of transistors 18 and 40. The following discussion will expand on the theory of operation of the circuit 14-1 and each of the two extreme cases previously defined.

As previously defined, in the first case transistor 18 is a high gain type such as a Darlington, while transistor 40 has a relatively low gain. In this case, resistor 60 is shorted out, the network consisting of resistor 70 and diode 64 is replaced by an open circuit and the value of resistor 54 is selected to be equal to $(V_{C28} - V_{BE40})/I_{B140}$. Furthermore, one or more diodes may have to be placed in series with diode 62 in order to allow the use of a lower valued resistor 54, thus increasing the base drive of transistor 40 without increasing that of transistor 18. In such case, an equal number of diodes should then be added in series with resistor 50 in order to avoid the possibility of forward biasing the base-emitter junction of transistor 40 when Va has the polarity shown in FIG. 2. To further clarify the use of the circuit 14-1,2 in a first case situation, the following example is provided.

It will be assumed that transistor 18 is a high-gain, Darlington-type transistor with a gain of 100 at a collector current level of 5 amperes and at a collector-emitter voltage in the saturated condition of 1.5 volts. Regarding transistor 40, it will be assumed to be a low cost, low-gain type having a gain of 10 at a collector current level of 2 amperes and at a collector-emitter voltage in the saturated condition of 1.5 volts. The IB1 of transistor 18 IB118 should then be at least equal to the collector current divided by the gain of transistor 18, or 5 amperes/100, or 50 milliamperes. In general, the design should allow some margin in the value of IB118, so IB118 shall be chosen to be 100 milliamperes, which will also provide faster turn-on time than by using the 50 milliampere value that was calculated. It further will be assumed that the desired storage time is one microsecond and that the transistor manufacturer's data on transistor 18 specifies a reverse base current IB218 of 2 amperes to achieve the one microsecond storage time and a capacitor voltage VC28 of approximately four volts for this value of IB218 to flow in the circuit. It will additionally be assumed that the data sheet for transistor 18 specifies that for a current of 100 milliamperes into the base of transistor 18, the worst case voltage between the base and emitter of transistor 18 VBE18 is equal to two volts. From this, the value of Va is calculated as:

$$V_a = V_{BE18} + V_{C28} + V_{D30} + V_{R50} \quad (1)$$

where VD30 is the voltage across diode 30 and VR50 is the voltage drop across resistor 50. Since the voltage drop across resistor 50 VR50 is negligible in comparison with all the other voltages, it can be neglected. The voltage drop across diode 30 (and all other diodes used) is assumed to be approximately 0.8 volts. Then $$V_a = 2 + 4 + 0.8 + 0 = 6.8 \text{ volts}$$

Next, the value of resistor 54 is computed as:

$$R54 = (V_a - V_{D62} - V_{BE18})/I_{B118} \quad (2)$$

where VD62 is the voltage across diode 62. Then $$R54 = (6.8 - 0.8 - 2)/0.1 = 40 \text{ ohms}$$

The latter equation (2) considers R54 with respect to the base drive needs of transistor 18 alone. In fact, the factor which determines the value of resistor 54 in this first case will really be transistor 40 because it is the transistor having low gain. Therefore, since it is known that transistor 40 needs a collector current of 2 amperes and that its gain is 10, then the base current of transistor 40 IB140 has to be 2 amperes/10 or 200 milliamperes. The base current of transistor 40 IB140 is supplied by the voltage across capacitor 28, and flows from the positive terminal to the negative terminal of capacitor 28, through resistor 54, through resistor 60, through the base-emitter junction of transistor 40 and back to capacitor 28. Thus, $$R54 + R60 = (V_{C28} - V_{BE40})/I_{B140} \quad (3)$$

where VC28 is equal to the voltage across the capacitor 28 and VBE40 is the specified base-emitter drop of transistor 40. Then $$R54 + R60 = 4 - 1/0.2 = 15 \text{ ohms}$$

By a previous calculation it was determined that transistor 18 requires a 40 ohm resistor 54 in series with its base. If 40 ohms is used as a resistor 54, then transistor 40, which needs only 15 ohms in series with its base, will not have enough base drive and hence will never turn on fully. To the contrary, if 15 ohms is used for resistor 54, then far too much base current will be pumped into transistor 18, which will result in a longer storage time than desired.

To get around this problem, the 15 ohm value of resistor 54 is used, the value of resistor 60 is set to zero, and an attempt is made to reduce the base current of transistor 18 by other means. That is, the requirements of transistor 40 are satisfied first. By setting resistor 60 equal to zero, by the latter equation (3) resistor 54 necessarily equals 15 ohms. However, if this was all that was done, transistor 18 would see 15 ohms instead of 40 ohms. So, in order to remedy this situation without affecting circuit 14-1 in any other way, equation (2) must still be valid. Thus, setting resistor 54 equal to 15 ohms in equation (2) and solving for VD62, we have:

$$VD62 = Va - VBE18 - IB118 \cdot R54$$
$$VD62 = 6.8 - 2 - 0.1(15) = 3.3 \text{ volts} \quad (2')$$

Now, assuming each diode has a voltage drop of approximately 0.8 volts, by using four diodes in series for diode 62 the requirement for VD62 will be met. Thus, the circuit 14-1 will satisfy the requirements of both IB118 and IB218.

Next, an example of the other extreme, the second case, will be considered. As previously discussed, in the second case transistor 18 is a low gain type while transistor 40 has a relatively high gain. In this case, diode 62 is always a single diode and resistor 54 is selected as (Va−VD62−VBE18)/IB118. That is, resistor 54 is chosen to get the desired IB118. However, since the resulting base current through transistor 40 is too high, resistor 60 is used to limit the base current of transistor 40 is the desired value. As explained previously, the network of resistor 70 and diode 64 is used for the purpose of obtaining a circuit 14-1 which topologically appears the same to transformer 16 regardless of the polarity of Va. The value of resistor 70 is given by $$R70 = R54(R54 + R60)/R60 \quad (4)$$

It will be assumed that transistor 18 is a low-gain type having a gain of 10 at a collector current level of 10 amperes and a collector-emitter voltage of 1.5 volts; viz, under conditions when transistor 18 is well saturated. It will further be assumed that transistor 40 is of relatively high quality, having a gain of 20 at a collector current level of 3 amperes and a collector-emitter voltage of 1.5 volts. From this information, it can be seen that the base current of transmitter 18 should be at least 10 amperes divided by the gain of 10, or one ampere. It will additionally be assumed that the storage time should be quite short, say one microsecond, and the capacitor voltage VC28 should be about 4 volts. From the manufacturer's data sheet for transistor 18, the base emitter voltage drop VBE18 is one volt. From this, the value of Va is calculated as $$Va = VBE18 + VC28 + VD30 + VR50 \quad (5)$$

where VD30 is the voltage drop across diode 30 (assumed to be 0.8 volt) and VR50 is the IR drop across resistor 50 (which generally is negligible). Then $$Va = 1 + 4 + 0.8 + 0 = 5.8 \text{ volts.}$$

Next, the value of resistor 54 is computed as:

$$R54 = (Va - VD62 - VBE18)/IB118$$
$$R54 = (5.8 - 0.8 - 1)/1 = 4 \text{ ohms} \quad (6)$$

With the values thus far chosen, the base drive requirements of transistor 18 have been satisfied. In order to satisfy the base drive requirements of transistor 40, we must have $$R54 + R60 = (VC28 - VBE40)/IB140$$

where VBE40 is the manufacturer's specified base to emitter voltage drop of transistor 40 and IB140 is the base current required by transistor 40, or 3 amperes divided by the gain of 20, or 0.15 ampere. Then $$R54 + R60 = (4 - 1)/0.15 = 20 \text{ ohms}$$

Since R54 was previously calculated to be 4 ohms, then R60 is 16 ohms. Regarding the network composed of resistor 70 and diode 64, the value of resistor 70 is calculated from:

$$R70 = [R54(R54 + R60)]/R60$$

Thus, $$R70 = [4(4 + 16)]/16 = 5 \text{ ohms}$$

By utilizing the component values calculated, the desired circuit 14-1 requirements will be met. Thus, transistor 18 will be well saturated because one ampere is being pumped into its base and transistor 40 will be well saturated which will give a desirable IB218.

The latter two examples have illustrated the use of the circuit 14-1 in both the first and second extreme cases. Those skilled in the art will readily appreciate that since the circuit 14-1 accommodates both previously defined extremities, it will easily accommodate a situation between the two extremes; e.g., one where both transistors 18 and 40 are of low-gain type.

Having shown and described the preferred embodiment of the present invention, those skilled in the art will further realize that various omissions, substitutions and changes in forms and details of the present invention may be made without departing from the spirit of the invention. It is the intention, therefore, to be limited only as indicated by the scope of the following claims.

What is claimed is:

1. A base drive circuit for coupling control signals from a secondary winding of a coupling transformer into the base of a power switching transistor, said base drive circuit comprising:
   a first diode connected between the emitter of said power switching transistor and a first end of said secondary winding;

a series combination of a first resistive element and a second diode, said series combination connected between the emitter of said power switching transistor and the first end of said secondary winding; and a switching transistor, the collector of said switching transistor connected to a second end of said secondary winding and the base of said power switching transistor, the emitter of said switching transistor connected through a first capacitor to the emitter of said power switching transistor, the base of said switching transistor connected between said first resistor and said second diode, the emitter of said switching transistor further connected through a second resistive element to third and fourth diodes, said third diode connected to the first end of said secondary winding, said fourth diode connected to the second end of said secondary winding.

2. The base drive circuit in accordance with claim 1 further including at least one additional diode connected in series with said second diode.

3. The base drive circuit in accordance with claim 1 further characterized in that:
one side of said first resistive element is connected to the emitter of said power switching transistor; and
the cathode of said second diode is connected to the first end of said secondary winding.

4. The base drive circuit in accordance with claim 3 further characterized in that said second resistive element is connected to the anodes of said third and fourth diodes.

5. The base drive circuit in accordance with claim 4 further characterized in that the positive side of said first capacitor is connected to the emitter of said power switching transistor.

6. The base drive circuit in accordance with claim 5 further characterized in that the cathode of said first diode is connected to the emitter of said power switching transistor.

7. A base drive circuit for coupling control signals from a secondary winding of a coupling transformer into the base of a power switching transistor, said base drive circuit comprising:
a first diode connected between the emitter of said power switching transistor and a first end of said secondary winding;
a first series combination of a first resistive element and a second diode, said first series combination connected between the emitter of said power switching transistor and the first end of said secondary winding;
a switching transistor, the collector of said switching transistor connected to a second end of said secondary winding and the base of said power switching transistor, the emitter of said switching transistor connected through a first capacitor to the emitter of said power switching transistor, the base of said switching transistor connected through a third resistive element to a point between said first resistive element and said second diode, the emitter of said switching transistor further connected through a second resistive element to third and fourth diodes, said third diode connected to the first end of said secondary winding, said fourth diode connected to the second end of said secondary winding; and a second series combination of a fourth resistive element and a fifth diode, said second series combination connected between the base and the emitter of said power switching transistor.

8. The base drive circuit in accordance with claim 7 further characterized in that:
one side of said first resistive element is connected to the emitter of said power switching transistor;
the cathode of said second diode is connected to the first end of said secondary winding;
one side of said fourth resistive element is connected to the base of said power switching transistor; and
the anode of said fifth diode is connected to the emitter of said power switching transistor.

9. The base drive circuit in accordance with claim 8 further characterized in that:
said second resistive element is connected to the anodes of said third and fourth diodes;
the positive side of said first capacitor is connected to the emitter of said power switching transistor; and
the cathode of said first diode is connected to the emitter of said power switching transistor.

10. A high frequency inverter for supplying an ac type voltage to a load, comprising:
a coupling transformer;
first switching means, connected to the primary side of said coupling transformer, said first switching means for specifying a first time frame during which a first voltage level is to be applied to said load;
second switching means, connected to the primary side of said coupling transformer, said second switching means for specifying a second time frame during which a second voltage level is to be applied to said load;
first power switching means, connected to a first dc voltage level and a first side of said load, said first power switching means for connecting said first dc voltage level to said first side of said load;
second power switching means, connected to a second dc voltage level and said first side of said load, said second power switching means for connecting said second dc voltage level to said first side of said load;
wherein each of said first and second power switching means respectively includes a power switching transistor;
first turn-off means, connected to a first winding on the secondary side of said coupling transformer and responsive to said first power switching means, said first turn-off means for turning on and off said first power switching means;
second turn-off means, connected to a second winding on the secondary side of said coupling transformer and responsive to said second power switching means, said second turn-off means for turning on and off said second power switching means; and
wherein said first and said second turn-off means each includes
a first diode connected between the emitter of its said respective power switching transistor and a first end of its said respective secondary winding,
a series combination of a first resistive element and a second diode, said series combination connected between the emitter of its said respective power switching transistor and a first end of its said respective secondary winding, and a switching transistor, the collector of said switching transistor connected to a second end of its said respective secondary winding and the base of its said respective power switching transistor, the emitter of said switching transistor connected through a first capacitor to the emitter of its said respective power switching transistor, the base of said switching transistor connected between said first resistive element and said second diode, the emitter of said switching transistor further connected through a second resistive element to third and fourth diodes, said third diode connected to the first end of its said respective secondary winding, said fourth diode connected to the second end of its said respective secondary winding.

11. The high frequency inverter in accordance with claim 10 further characterized in that:
one side of said first resistive element is connected to the emitter of its said respective power switching transistor;
the cathode of said second diode is connected to the first end of its said respective secondary winding;
said second resistive element is connected to the anodes of said third and fourth diodes;
the positive side of said first capacitor is connected to the emitter of its said respective power switching transistor; and
the cathode of said first diode is connected to the emitter of its said respective power switching transistor.

12. The high frequency inverter in accordance with claim 10 or 11 further including at least one additional diode connected in series with said second diode.

13. A high frequency inverter for supplying an ac type voltage to a load, comprising:
a coupling transformer;
first switching means, connected to the primary side of said coupling transformer, said first switching means for specifying a first time frame during which a first voltage level is to be applied to said load;
second switching means, connected to the primary side of said coupling transformer, said second switching means for specifying a second time frame during which a second voltage level is to be applied to said load;
first power switching means, connected to a first dc voltage level and a first side of said load, said first power switching means for connecting said first dc voltage level to said first side of said load;
second power switching means, connected to a second dc voltage level and said first side of said load, said second power switching means for connecting said second dc voltage level to said first side of said load;

wherein each of said first and second power switching means respectively includes a power switching transistor;
first turn-off means, connected to a first winding on the secondary side of said coupling transformer and responsive to said first power switching means, said first turn-off means for turning on and off said first power switching means;
second turn-off means, connected to a second winding on the secondary side of said coupling transformer and responsive to said second power switching means, said second turn-off means for turning on and off said second power switching means; and
wherein said first and said second turn-off means each includes
a first diode connected between the emitter of its said respective power switching transistor and a first end of its said respective secondary winding,
a first series combination of a first resistive element and a second diode, said first series combination connected between the emitter of its said respective power switching transistor and the first end of its said respective secondary winding,
a switching transistor, the collector of said switching transistor connected to a second end of its said respective secondary winding and the base of its said respective power switching transistor, the emitter of said switching transistor connected through a first capacitor to the emitter of its said respective power switching transistor, the base of said switching transistor connected through a third resistive element to a point between said first resistive element and said second diode, the emitter of said switching transistor further connected through a second resistive element to third and fourth diodes, said third diode connected to the first end of its said respective secondary winding, said fourth diode connected to the second end of its said respective secondary winding, and
a second series combination of a fourth resistive element and a fifth diode, said second series combination connected between the base and the emitter of its said respective power switching transistor.

14. The base drive circuit in accordance with claim 13 further characterized in that:
one side of said first resistive element is connected to the emitter of its said respective power switching transistor;
the cathode of said second diode is connected to the first end of its said respective secondary winding;
one side of said fourth resistive element is connected to the base of its said respective power switching transistor; and
the anode of said fifth diode is connected to the emitter of its said respective power switching transistor.

* * * * *